United States Patent [19]

Sugino et al.

[11] 4,362,752

[45] Dec. 7, 1982

[54] SIMULATED SHRIMP MEAT AND PROCESS FOR PREPARING SAME

[76] Inventors: Yoshito Sugino; Norihiko Yamamoto, both c/o Sugiyo Co., Ltd. 27, Ingai, Fuchu-machi, Nanao, Ishikawa, Japan

[21] Appl. No.: 251,889

[22] Filed: Apr. 7, 1981

[30] Foreign Application Priority Data

Apr. 7, 1980 [JP] Japan .................................. 55-46087
Apr. 19, 1980 [JP] Japan .................................. 55-51939

[51] Int. Cl.³ .......................... A23J 3/00; A23L 1/04; A23L 1/325
[52] U.S. Cl. .................................... 426/104; 426/250; 426/643; 426/656; 426/657; 426/658; 426/512; 426/802; 426/574
[58] Field of Search .............. 426/104, 274, 276, 574, 426/643, 802, 250, 656, 657, 658, 512

[56] References Cited

U.S. PATENT DOCUMENTS

| | | | |
|---|---|---|---|
| 3,852,484 | 12/1974 | Cabot | 426/104 |
| 3,863,017 | 1/1975 | Yueh | 426/643 |
| 4,000,331 | 12/1976 | Tanaka et al. | 426/574 |
| 4,158,065 | 6/1979 | Sugino | 426/104 |
| 4,275,084 | 6/1981 | Ohyabu et al. | 426/802 X |

*Primary Examiner*—Robert A. Yoncoskie
*Attorney, Agent, or Firm*—Fidelman, Wolffe & Waldron

[57] ABSTRACT

A product of fish meat paste simulating shrimp, prawn or lobster, prepared by mixing 1 part by weight of fish meat paste and 0.2 to 2.5 parts by weight of edible fibrous material having a three-dimensional reticulate structure, kneading the mixture and forming the kneaded mixture into pieces of a predetermined shape and size. The fibrous material may be replaced by 0.4 to 2.0 parts by weight of edible fibers of less than 0.5 mm in diameter. The edible fibrous material or fibers incorporated into the fish meat paste impart to the product a texture which gives a particular oral sensation as if real shrimp, prawn or lobster were being eaten.

18 Claims, 1 Drawing Figure

SIMULATED SHRIMP MEAT AND PROCESS FOR PREPARING SAME

BACKGROUND OF THE INVENTION

This invention relates to a product of fish meat paste simulating in both taste and texture the meat of macrura such as shrimp, prawn, and lobster. In the specification the term "shrimp" will be representatively used to refer to any of the macrura only for simplicity of expression and not for limitation of the scope of the invention in any sense.

Many people like shrimp meat since it contains little fat and has not only a light flavor but also a texture which causes a particular oral sensation or a kind of resistance to mastication when the meat is eaten.

In recent years, due to various causes such as indiscriminate fishing or restriction on fishing within the 200-mile territorial waters, the catch of shrimps is decreasing so that the supply cannot meet the demand.

To improve the situation attempts have been made to provide substitutes for shrimp meat, one of which comprises a fish meat paste coagulated and seasoned with a flavor like that of shrimp meat.

One type of simulated shrimp meat now on the market comprises nothing more than a coagulated fish meat paste mixed with shrimp meat or the essence extracted therefrom so that it has merely a taste or flavor similar to that of shrimp meat. The known simulated shrimp meat does not have the texture of real shrimp meat which gives a particular oral sensation or a kind of crispness combined with elasticity. Indeed there have been no substitutes for shrimp meat which satisfy the consumers with respect to the complex oral sensation experienced upon biting them.

In the marine product industry various studies and experiments have been and may be being conducted to produce a substitute for shrimp meat which has not only a flavor but also a texture similar to that of real shrimp meat. To the best knowledge of the present inventors, however, there have been no technical reports or literature on the method of producing a simulated shrimp meat having such a texture as to give substantially the same oral sensation as real shrimp meat when it is eaten.

With respect to the crab, a crustacean like shrimp, there has already been on the market a substitute which has not only a flavor similar to that of real crab meat but also a texture which gives substantially the same oral sensation as if real crab meat was eaten.

A method of providing a substitute for crab meat by imparting to coagulated fish meat paste both flavor and texture similar to those of real crab meat is disclosed in Japanese unexamined patent publication No. 54-14552. According to this method, fish meat paste is molded into a predetermined shape, which is shredded into fiber-like pieces having a diameter of about 1 mm. The fiber-like pieces are assembled and heated to form a solid mass of a predetermined shape which has an integral surface layer covering internal fiber-like pieces bound together with such a degree of binding force that when bitten the fiber-like pieces are separated.

It is also publicly known to bind together the fiber-like pieces into a solid mass by means of a binder made of fish meat "surimi".

The "surimi", a Japanese word, used herein means the fish meat obtained in the following manner: The guts are removed from a fish, which is then crushed or squeezed so that somewhat mashed flesh or meat is separated from the skin, head, bones, and other components of the fish. The separated mass of meat is then rinsed in water so that water-soluble proteins are removed from the meat. The fish meat thus obtained is "surimi".

The above known method has been successful in producing a simulated crab meat resembling real crab meat in taste and texture. By this known method, however, it has been impossible to produce a simulated shrimp meat which is similar to real shrimp meat in both taste and texture.

The reasons why this is so are believed to be as follows: Crab meat comprises a plurality of bundles of muscle fibers arranged lengthwise, each bundle having a diameter of 1 mm to 2 mm. When crab meat is bitten by the teeth, the bundles of muscle fibers are separated into individual bundles or fibers giving a particular oral sensation or a kind of resistance to mastication to the person who is eating crab meat. Therefore, if a plurality of fibers made of fish meat paste and having a diameter of about 1 mm are put together to form a solid mass which has an integral surface layer covering the internal fibers bound together so that the fibers are separable when bitten, it is possible to produce a simulated crab meat which resembles real crab meat in texture.

On the other hand, shrimp meat comprises a plurality of muscle fibers each several to several hundred $\mu m$ in diameter closely intertwined. When shrimp meat is bitten into to break or cut the component muscle fibers, the biting teeth are somewhat elastically resisted as if the fibers had shearing stresses of two different degrees, that is, a stronger stress and a weaker one, which are believed to cause the previously described particular oral sensation or kind of crispness combined with elasticity. With the above-mentioned known method, however, it has been found impossible to produce a texture similar to that of shrimp meat in the products of fish meat paste.

Those skilled in the art might consider that if the above known method were advanced so that the molded product of fish meat paste were cut into minute fiber-like pieces of several to several hundred $\mu m$, which were put together into a solid mass, the mass would have a texture similar to that of shrimp meat.

To the best knowledge of the present inventors, however, there are publicly known no technical means which enable cutting a molded solid product of fish meat paste into such minute fiber-like pieces as mentioned above. Should there be any such means, it would be impossible to have such fiber-like pieces so closely intertwined as in shrimp meat as to provide a substitute for shrimp meat with a texture which would give an oral sensation similar to that experienced when real shrimp meat was eaten.

In view of the foregoing the present inventors have conducted various studies and experiments and come to a conclusion that so long as fish meat paste alone is employed, it is utterly impossible to produce a texture similar to that of real shrimp meat in whatever manner the paste may have been processed, and at the same time found out that if fish meat paste is mixed with edible fibrous material, it is possible to impart to the coagulated product of the paste a texture which gives an oral sensation as if real shrimp meat was bitten.

SUMMARY OF THE INVENTION

The primary object of the invention is therefore to provide a product of fish meat paste which resembles shrimp meat in taste and texture.

Another object of the invention is to provide such a product as aforesaid which, when eaten, gives a blend of sensations such as taste, smell and touch as if real shrimp was being eaten.

Another object of the invention is to produce such a product as aforesaid which is highly preservable and suitable for mass production.

Another object of the invention is to provide a method of producing such a simulated food as aforesaid which enables mass production with ease and economy.

In one aspect of the invention, the simulated shrimp meat comprises a coagulated mass of fish meat paste prepared by mixing 1 (one) part by weight of fish meat paste prepared by grinding fish meat "surimi" with one or more of salt and other seasonings, starch and a texturing agent, and more than 0.2 parts by weight of edible fibrous material of a three-dimensional reticulate structure resembling a tangled mass of threads or the fibrous skelton of a luffa fruit, and causing the mixture to be coagulated.

In another aspect of the invention, the simulated shrimp meat comprises a coagulated mass of fish meat paste prepared by mixing 1 (one) part by weight of fish meat paste prepared by grinding fish meat "surimi" with one or more of salt and other seasonings, starch and a texturing agent, and more than 0.4 parts by weight of animal and/or vegetable fibers of less than 0.5 mm in diameter, and causing the mixture to be coagulated.

BRIEF DESCRIPTION OF THE DRAWING

The invention will be described in detail with reference to the accompanying drawing wherein.

DETAILED DESCRIPTION OF THE INVENTION

Figure 1:
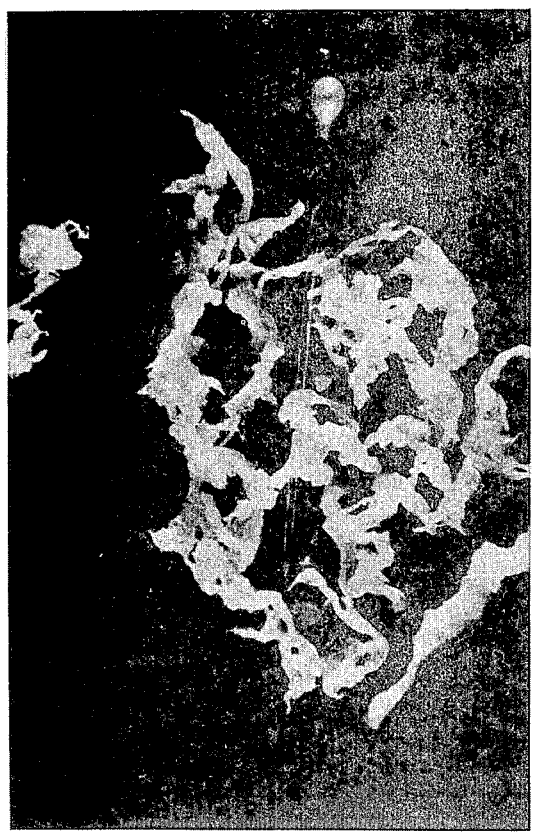
FIG. 1 is a photograph of the fibrous material of a three-dimensional reticulate structure to be incorporated into the fish meat paste of the simulated food produced in accordance with the invention, with a pin shown for comparison.

The edible fibrous material having a three-dimensional reticulate structure appears as shown in FIG. 1 and comprises a large number of irregularly shaped minute fibers most of which are less than 1 mm in diameter and have branches or ramifications so that the fibers are intertwined to form a three-dimensional reticulate structure resembling a tangled mass of threads or the fibrous skelton of a luffa fruit.

The fibrous material may be made from polysaccharides, animal proteins, vegetable proteins, or vegetable fibrous material, which are processed to become edible. Examples of polysaccharide are mannan and alginic acid, of which mannan is preferable.

The fibrous material may be made from devil's tongue jelly (or "konnyaku" in Japanese) in the following manner. First devil's tongue mannan is dissolved in water to prepare a 2% to 10% solution thereof, to which an alkali is added as a gelation accelerator to cause the solution to gel. Examples of alkali are sodium carbonate, sodium bicarbonate, sodium hydroxide, calcium hydroxide, and any one or a mixture of the compounds can be used. If necessary, the pH of the solution may be adjusted to preferably more than 8 and the solution may also be heated to preferably higher than 60° C.

An appropriate amount of starch or fish meat "surimi" may also be previously added to the mannan solution so as to increase the yield of the fibrous material and at the same time improve the property of the fibrous material to be incorporated into the fish meat paste.

The gel obtained in the above manner is then put in a mill of a horizontal type, which comprises a stationary outer member and a rotatable inner member provided inside the outer member and having an outer circumferential surface with grooves formed thereon in sliding contact with the inner circumferential surface of the outer member.

The machine twists, squeezes and crushes the gel and the crushed material is sufficiently rubbed in water so that the fibers contained in the material are loosened and the soluble alkali is eluted therefrom, whereupon an edible fibrous material of a three-dimensional reticulate structure as shown in FIG. 1 is obtained.

Substantially the same steps as the above may be followed if any other polysaccharide than devil's tongue mannan is used as the starting material.

The method of making a fibrous material of a three-dimensional reticulate structure from animal protein will now be described. Examples of animal protein are thermally denatured protein obtained by boiling or steaming beef, chicken, bream, cod, cuttlefish, squid, etc. which have relatively strong fibrous tissues and protein denatured by dehydration of the above animal or fish meat.

First, water is added to any of the above-mentioned denatured proteins to form a gel thereof, which is squeezed and crushed by a mill of the previously described type so as to be extruded therefrom. Alternatively, the gel is stamped or pounded in a bowl made of a hard material such as hard metal, stone and ceramic. The extrudate or pounded material is sufficiently rubbed in water, if necessary, so as to be loosened or disentangled with soluble ingredients being eluted therefrom, whereupon an edible fibrous material having the three-dimensional reticulate structure as shown in FIG. 1 and appearing like a tangled mass of threads is obtained.

Vegetable proteins such as, for example, soybean protein and gluten can also be used as the starting material to produce the above-mentioned edible fibrous material. To take soybean protein for example, a polysaccaride, for example, alginic acid and a coagulant, for example, calcium chloride are added to soybean protein, and the mixture is extruded and coagulated into fibrous threads or a sheet-like mass, which is squeezed and crushed by a mill of the previously mentioned horizontal type so as to be extruded therefrom. The extrudate is then sufficiently rubbed in water so as to become loosened or disentangled, and the result is an edible fibrous material having the three-dimensional reticulate structure as shown in FIG. 1.

The invention is not restricted to the fibrous material produced by the above-mentioned methods, but those produced in any other ways may also be used provided that they have a structure similar to that shown in FIG. 1.

The edible animal fibers can be made in the following manner from thermally denatured proteins obtained by boiling or steaming animal or fish meat having relatively hard fibrous tissues such as beaf, pork, chicken, the flesh of sea bream, cod or squid, or from denatured proteins produced by dehydration of the above animal or fish meat. The starting material is passed through a rolling mill such as a conventional dried squid rolling machine and the rolled material is stamped in a bowl made of a hard material such as hard metal, stone and ceramic, or crushed by a hammer crusher so as to be rendered fibrous.

If necessary, the fibers thus obtained are suspended in a large amount of water thereby to remove fibers thicker than about 0.5 mm in diameter so that fibers within a predetermined range of diameter can be obtained.

The edible vegetable fibers can be made from vegetable proteins, e.g. soybean protein by mixing the protein with polysaccharide, hydrocarbon, coagulant and other necessary substances or agents, so as to be coagulated and extruding the coagulated material by means of a known thread extrusion forming method to form thin threads of a predetermined diameter, which are cut into pieces of about 30 to 50 mm in length.

The above described edible animal or vegetable fibers are preferably less than 0.5 mm in diameter, and more than 0.4 part by weight of the fibers must be added to 1 (one) part by weight of the fish meat paste to be described below.

The fish meat paste with which the edible fibrous material of three-dimensional reticulate structure or the edible animal or vegetable fibers as described above are mixed according to the invention can be the conventional raw material for "kamaboko" and "chikuwa", both traditional Japanese food.

The raw material is a viscous paste which is prepared by grinding "surimi" of fish such as cod, pollack, red tilefish, conger eel, etc. with an appropriate amount of water to break the tissues. When the paste is boiled or steamed or left as it is for a certain period of time, it is coagulated into a gel.

Usually, one or more of common salt and other seasonings such as, monosodium gultamate, starch and a texturing agent such as potassium or sodium polyphosphate or metaphosphate may also be added to the paste.

In accordance with the invention, "surimi" of shrimp meat or the essence extracted from shrimp is added to the paste to impart flavor and smell similar to those of shrimp meat.

In one preferred embodiment of the invention, the method of producing a simulated shrimp meat comprises the steps of: preparing fish meat paste by the conventional method; preparing edible fibrous material having a three-dimensional reticulate structure resembling the fibrous skelton of a luffa fruit; mixing 1 part by weight of the fish meat paste and more than 0.2 part by weight of the edible fibrous material; kneading the mixture; forming the kneaded material into a predetermined shape; and boiling or steaming the shaped material to coagulate.

In another preferred embodiment of the invention the method comprises the steps of: preparing fish meat paste by the conventional method; preparing edible animal and/or vegetable fibers of less than 0.5 mm in diameter; mixing 1 part by weight of the fish meat paste and more than 0.4 part by weight of the edible fibers; kneading the mixture; forming the kneaded mixture into a predetermined shape; and boiling or steaming the shaped material to coagulate.

In either of the two embodiments, the step of preparing fish meat paste can be the conventional step of grinding "surimi" of fish meat with an appropriate amount of ice water into a viscous paste by means of a mill. The fish can be frozen fish available on the market, which is defrosted for use.

For the step of preparing the edible fibrous material or the edible animal or vegetable fibers the appropriate one of the previously mentioned methods can be employed.

The step of kneading the mixture of the fish meat paste and the edible fibrous material or fibers is conducted by using a suitable machine so that the materials are uniformly mixed and kneaded.

The steps of shaping and boiling or steaming the kneaded material can be carried out in the same manner as in the conventional process for making "kamaboko" or "chikuwa", wherein the material is poured into a mold preferably having the shape of a shrimp, or the material is rolled to form a sheet, which is formed into a desired shape, or the material is boiled or steamed and then cut into a sheet which is formed into a desired shape. The conditions for the boiling or steaming step are similar to those for the conventional process for making the known products of fish meat paste. Normally the material is heated at a temperature above about 70° C. for 20 to 50 minutes.

The product may be colored wth an edible colorant so as to look like a shrimp thereby to satisfy the consumer visually. For example, the kneaded material is left for gelation to a certain degree, and the resultant gel-like mass is continuously extruded through a die having a cross-sectional shape of a shrimp, with a plurality of lines being simultaneously drawn with an edible red pigment on the upper surface of the extrudate as it comes out of the die. The colored extrudate is then boiled or steamed and cut into shrimp-shaped pieces.

As previously described, in accordance with the invention more than 0.2 part by weight of edible fibrous material of the three-dimensional reticulate structure or more than 0.4 part by weight of edible fibers of less than 0.5 mm in diameter is incorporated into fish meat paste. The incorporation is believed to impart to the product of fish meat paste a texture which gives to the person who bites it a particular oral sensation or mouth-feel as if he or she was eating real shrimp meat. The reasons why this is so are believed to be as follows, although no sufficient theoretical analysis thereof has yet been made:

Since edible fibrous material or minute fibers of a particular structure or size are dispersed within the fish meat paste in the state of gel, the shearing stress of the paste in the state of gel is different from the shearing stress of the fibrous material of the minute fibers therein so that two different kinds of resistance to mastication are encountered when the product is eaten. In other words, the sensation or touch to the teeth followed by a kind of resistance to mastication when the fish meat gel of the product is bitten and the different sensation or touch followed by a different degree of resistance to mastication when the fibrous material or fibers contained in the gel are bitten are combined to give an particular oral sensation or mouthfeel approximate to that experienced when real shrimp meat is eaten.

Several sensory tests have been conducted with a plurality of experienced and unexperienced persons as panelists. The results of the tests have led to a conclusion that in order to impart to the finished product of fish meat paste a texture which gives an oral sensation similar to that experienced when real shrimp meat is eaten, more than 0.2 part by weight of the edible fibrous material of the three-dimensional reticulate structure or more than 0.4 part by weight of the edible fibers must be added to 1 (one) part by weight of the fish meat paste.

In the tests the following samples A through Q having different compositions were compared with the heat cooked meat of real shrimp.

Samples A through H were prepared by adding the following amounts in part by weight of the edible fibrous material of the three-dimensional reticulate structure prepared as in Example 1 to 1 (one) part by weight of the fish meat paste prepared by the conventional method; Sample I was the same as Sample D prepared in Example 1 except that the edible fibrous material was made from the animal protein fibers of squid about 1.5 mm in diameter and about 25 mm in length; Samples J through P were prepared by adding the following amounts in part by weight of the edible fibers prepared as in Example 6 and having a diameter of about 0.2 to 0.4 mm and a length of about 15 to 20 mm to 1 (one) part by weight of the fish meat paste prepared by the conventional method; and Sample Q was the same as Sample M prepared in Example 6 except that the edible fibers incorporated into the fish meat paste was about 0.8 mm in diameter and about 20 mm in length.

No taste or flavor similar to shrimp meat was imparted to the fish meat paste.

| Sample | Amount of fibrous material (A–I) or fibers (J–Q) (in parts by weight) |
|---|---|
| A | 0.05 |
| B | 0.1 |
| C | 0.5 |
| D | 0.7 |
| E | 1.0 |
| F | 1.5 |
| G | 2.0 |
| H | 3.0 |
| I | 0.7 |
| J | 0.3 |
| K | 0.5 |
| L | 0.8 |
| M | 1.0 |
| N | 1.5 |
| O | 1.8 |
| P | 2.2 |
| Q | 1.0 |

1. Ten experts, that is, those skilled in the art of making products of fish meat paste were employed to evaluate Samples A through H in comparison with heat cooked real shrimp meat (to be referred to as the reference). The results are as follows:

Sample A was felt by none of the 10 panelists similar to the reference and different from conventional "kamaboko".

Sample B was felt by four of the 10 panelists similar to the reference.

Sample C was felt by nine of the 10 panelists similar to the reference.

Sample D was felt by all of the 10 panelists very similar to the reference.

Sample E was felt by all of the 10 panelists very similar to the reference.

Sample F was felt by all of the 10 panelists very similar to but somewhat less elastic than the reference.

Sample G was felt by six of the 10 panelists similar to the reference.

Sample H was felt by nine of the 10 panelists dry and lacking elasticity.

2. Twenty unexperienced persons such as housewives were employed as panelists to evaluate Samples D and I in comparison with the above-mentioned reference. The results are as follows:

Sample D was felt by all of the 20 panelists very similar to the reference.

Sample I was felt by six of the 20 panelists similar to but somewhat harder than the reference, and by fourteen of them unlike the reference.

When the product of Sample D was served fried, almost all of the 20 unexperienced panelists found it indistinguishable from the fried meat of frozen real shrimp available on the market.

3. Ten experts, that is, those skilled in the art of making products of fish meat paste were employed as panelists to evaluate Samples J through P in comparison with the above-mentioned reference. The results are as follows:

Sample J was felt by seven of the 10 panelists unlike the reference and not different from conventional "kamaboko".

Sample K was felt by eight of the 10 panelists similar to the reference.

Sample L was felt by all of the 10 panelists similar to the reference.

Sample M was felt by all of the 10 panelists very similar to the reference.

Sample N was felt by all of the 10 panelists very similar to the reference.

Sample O was felt by three of the 10 panelists very similar to but somewhat less elastic than the reference.

Example P was felt by six of the 10 panelists similar to the reference by dry and lacking elasticity.

4. Twenty unexperienced persons such as housewives were employed as panelists to evaluate Samples M and Q in comparison with the above-mentioned reference. The results are as follows:

Sample M was felt by all of the 20 panelists very similar to the reference.

Sample Q was felt by thirteen of the 20 panelists similar to the reference but dry and lacking elasticity, and by the remaining seven unlike the reference.

When the product of Sample M was served fried, almost all of the 20 unexperienced panelists found it indistinguishable from the fried meat of frozen real shrimp available on the market.

The above and other sensory tests and associated experiments have led the present inventors to the following conclusion:

When the edible fibrous material incorporated into the matrix of fish meat paste is the fibrous material having the three-dimensional reticulate structure, more than 0.2 part by weight of the fibrous material must be added to 1 (one) part by weight of the paste. The best results are obtained by addition of 0.4 to 1.5 parts by weight.

Addition of more than 2.5 parts by weight, however, not only adversely affects the resultant product with respect to the touch in the mouth although the product is generally felt similar to real shrimp meat, but also causes a difficulty in forming the product into a desired shape. Practically, therefore, 2.5 parts by weight is preferred as the upper limit.

The length of the fibers constituting the reticulate fibrous material does not particularly affect the sensation felt when the product is eaten so that it may be determined with various factors taken into consideration. Preferably the length is from 5 mm to 25 mm.

When the edible fibrous material comprises animal or vegetable fibers, more than 0.4 part by weight of the fibers must be added to 1 (one) part by weight of fish meat paste. The best result is obtained with addition of 0.6 to 1.5 parts by weight. Addition of more than 2.2 parts by weight, however, not only adversely affects the product with respect to the touch in the mouth although the product is generally felt similar to real shrimp meat when eaten, but also causes a difficulty in forming the product into a desired shape. Practically, therefore, 2.0 parts by weight is preferred as the upper limit.

There is some difference in strength between edible animal fibers and edible vegetable fibers. Generally the former has less strength than the latter, so that the former is added in a little greater amount than the latter with a better result. For example, the amount of edible animal fibers to be added is 0.5 to 2.0 parts by weight and preferably 0.7 to 1.5 parts by weight, while the amount of edible vegetable fibers to be added is 0.4 to 1.0 part by weight and preferably 0.5 to 0.8 part by weight.

The size of the edible animal and vegetable fibers is less than 0.5 mm. There needs be no lower limit to the diameter of the fibers. Practically, however, the smallest diameter available on mass production basis is about 0.1 mm, and even such thin fibers can impart to the product a textural characteristic which gives an oral sensation similar to that experienced when real shrimp meat is eaten.

The length of the fibers does not particularly affect the oral sensation so that it may be determined, taking various factors into consideration. Preferably the length is from 5 to 30 mm.

The invention will be explained in more detail by way of the following examples.

EXAMPLE 1

A. Preparation of edible fibrous material of three-dimensional reticulate structure.

2.5 kg of devil's tongue mannan was dissolved in 100 liters of water to prepare a sol, with which 5 kg of cow's milk, 10 kg of starch and 15 kg of "surimi" of fish meat were mixed so as to produce a viscous paste. A 20% sodium carbonate aqueous solution was prepared separately and added to the paste while stirring the mixture to adjust the pH of the paste to 10.2. The paste was then steamed for 40 minutes into the state of gel.

The gel-like material was fed into a mill of the previously described type so as to be twisted, rubbed and squeezed and then extruded to provide a fibrous material of a three-dimensional reticulate structure with a water content of 67%. The yield was about 65 kg.

FIG. 1 is a microscopic photograph of the fibrous material thus obtained.

B. Preparation of fish meat paste.

100 kg of "surimi" of frozen fish was prepared and mixed with 1 kg of seasonings, 35 kg of ice water, 6 kg of starch, 2.5 kg of common salt, 0.1 kg of a texturing agent and 10 kg of "surimi" of shrimp meat to produce 110 kg of fish meat paste.

C. Kneading, shaping and steaming.

8 lots of 20 kg each of the fish meat paste prepared as in step B were provided, and 1 kg, 2 kg, 10 kg, 14 kg, 20 kg, 30 kg, 40 kg and 60 kg of the edible fibrous material prepared as in step A were added to the eight lots, respectively. After sufficient kneading, the kneaded material in each of the lots was formed into a sheet of 7 mm in thickness, which was steamed at a temperature of about 90° C. for 30 minutes for coagulation, and shrimp-shaped pieces were stamped out from the coagulated sheet.

The shrimp-shaped pieces thus obtained from the eight lots were subjected to the previously described sensory tests as Samples A through H.

EXAMPLE 2

50 kg of the fish meat paste and 75 kg of the edible fibrous material both prepared as in Example 1 were mixed and kneaded and then left at 45° C. for 1 hour for gelation. The resulting material was extruded through a shrimp-shaped die, with five lines simultaneously applied to the top surface of the extrudate with an aqueous solution of an edible red pigment.

The colored extrudate was then cut by means of a cutter having a pair of particularly shaped upper and lower blades into pieces of 1 cm in width, which resembled real shrimps. The pieces were steamed at about 90° C. for 40 minutes. The yield was 100 kg.

EXAMPLE 3

50 kg of the fish meat paste and 75 kg of the edible fibrous material both prepared as in Example 1 were mixed and formed into a sheet of 1 cm in thickness, which was steamed at about 95° C. for 40 minutes and then formed into shrimp-shaped pieces, which were divided into two groups.

The pieces of the first group were coated with a sol solution of ordinary flour used for the purpose and fried in oil at the oil temperature of 180° C.

The pieces of the second group were crumbed and then preserved in a refrigerator at −20° C. for 30 days, after which the frozen pieces were defrosted and fried at the oil temperature of 180° to 160° C.

The fried pieces of the first and second groups were found quite similar in taste and texture to fried real shrimp now available on the market and cooked in the above two different manners. It was difficult to discriminate between the products of the invention and those on the market.

EXAMPLE 4

20 kg of dried squid was cut into pieces of 5 mm in width, to which water is added so that the pieces were well moistured and swollen. The pieces were divided into two groups and those of the first group were crushed and squeezed by a mill of the previously described horizontal type so as to be extruded therefrom. The extrudate was well rubbed in a large amount of water so that water soluble ingredients in the extrudate were eluted therefrom.

The pieces of the second group were passed through a dried squid rolling machine so that the fiber bundles were loosened or coarsely broken. The material was then put in a stone bowl and pounded from above so that the fiber bundles were further broken or separated. The resultant material was fully rubbed in a large amount of water to wash out water soluble ingredients.

The material obtained in the above two manners was squeezed, whereupon an edible fibrous material of three-dimensional reticulate structure resembling an intertwined mass of threads was obtained. The water content of the material was 67%. The yield was 40 kg.

50 kg of the edible fibrous material produced in the above-mentioned manner and 50 kg of the fish meat paste prepared as in Example 1 were kneaded into a sheet of 10 mm in thickness, which was steamed at about 95° C. for 40 minutes and then cut into shrimp-shaped pieces of a predetermined size.

EXAMPLE 5

10 kg of dry soybean powder available on the market and 500 g of sodium alginate were dissolved in 50 liters of water to obtain a viscous solution.

1 (one) liter of 20% calcium chloride aqueous solution was separately prepared and mixed with the viscous solution to obtain a gel-like mass.

The gel-like mass was cut into pieces, which were squeezed and crushed by a mill of the previously described horizontal type so as to be extruded therefrom. The extrudate was then well rubbed and washed in a large amount of water and then squeezed to remove excess water, whereupon a fibrous material of a three-dimensional reticulate structure was obtained with a water content of 65%. The yield was 25 kg.

100 kg of the fibrous material obtained in the above manner and 50 kg of the fish meat paste prepared as in Example 1 were kneaded into a sheet of 10 mm in thickness, which was steamed at about 95° C. for 30 minutes and cut into shrimp-shaped pieces of a predetermined size.

EXAMPLE 6

A. Preparation of edible fibers.

20 kg of raw meat of pollack was boiled for 30 minutes for heat denaturation and put in a stone bowl and pounded by a pestle to separate the fibers. The pounded material was then put in a large amount of water for removal of remaining lumps and particles of fibrous material and water soluble ingredients together with the water. The edible fibers thus obtained were 0.2 to 0.4 mm in diameter and about 15 to 20 mm in length.

When well drained of water oby squeezing, the water content of the fibers was 65%. The yield was 12 kg.

B. Preparation of fish meat paste.

100 kg of "surimi" of frozen fish meat was mixed with 1 kg of seasonings, 35 kg of ice water, 6 kg of starch, 2.5 kg of common salt, 0.1 kg of a texturing agent and 10 kg of "surimi" of shrimp meat to produce 110 kg of fish meat paste.

C. Kneading, shaping and steaming.

7 lots of 20 kg each of the paste prepared as in step B were provided, and 6 kg, 10 kg, 16 kg, 20 kg, 30 kg, 36 kg and 44 kg of the edible fibers prepared as in step A were added to the seven lots, respectively.

After full kneading, the kneaded material of each of the seven lots was formed into a sheet of 10 mm in thickness, which was steamed at about 95° C. for 30 minutes for coagulation, and shrimp-shaped pieces were stamped out from the coagulated sheets.

The pieces thus produced from the seven lots were subjected to the previously described comparative sensory tests as Samples J through P.

EXAMPLE 7

50 kg of the fish meat paste and 50 kg of the edible fibers both prepared as in Example 6 were mixed and kneaded and then left at 45° C. for 1 hour for gelation. The material thus obtained was extruded through a shrimp-shaped die, with five lines simultaneously applied to the top surface of the extrudate with an aqueous solution of an edible red pigment.

The colored extrudate was then cut by means of a cutter having a pair of particularly shaped upper and lower blades into pieces of 1 cm in width resembling real shrimps. The shrimp-shaped products were steamed at 95° C. for 40 minutes. The yield was 80 kg.

EXAMPLE 8

50 kg of the fish meat paste and 50 kg of the edible fibers both prepared as in Example 6 were mixed and formed into a sheet of 1 cm in thickness, which was boiled at about 95° C. for 40 minutes and then formed into shrimp-shaped pieces, which were divided into two groups.

The pieces of the first group were coated with a sol solution of ordinary flour used for the purpose and fried in oil at the oil temperature of 180° C.

The pieces of the second group were crumbed and then preserved in a refrigerator at −20° C. for 30 days, after which the frozen pieces were defrosted and fried at the oil temperature of 180° to 160° C.

The fried pieces of the first and second groups were found quite similar in taste and texture to fried real shrimp now available on the market and cooked in the above two different manners. It was difficult to discriminate between the products of the invention and those on the market.

EXAMPLE 9

10 kg of dried meat of swellfish was rolled flat by means of a dried squid rolling machine and then moistened and swollen with water. The material was again passed through the rolling machine, so that the fiber bundles of the fish meat were loosened and separated into individual fibers. The material thus treated was then washed with a large amount of water and the floating fibrous material was removed together with water. The result was 8 kg of edible fibers most of which are filaments of 0.1 to 0.3 mm in diameter and 10 to 25 mm in length, with a water content of 67%.

50 kg of the edible fibers prepared in the above manner and 50 kg of the fish meat paste prepared as in Example 6 were kneaded and formed into a sheet of 10 mm in thickness. The sheet was steamed at about 95° C. for 40 minutes and cut into shrimp-shaped pieces of a predetermined size.

EXAMPLE 10

A viscous liquid was prepared by mixing 2 kg of water soluble vegetable (chiefly soybean) protein powder, 0.3 kg of pectin and 6 kg of water. A 3.5% calcium chloride aqueous solution was separately prepared. The viscous liquid was poured into the calcium chloride solution in such a manner that the liquid being poured formed a continuous thread, which was taken out of the solution while being tensioned to form a thread of gel having a diameter of about 0.3 mm, which was wound onto a roll.

The thread of gel was cut into pieces of 20 to 30 mm in length, which were washed in a large amount of water to remove water soluble ingredients. The edible fibers obtained had a water content of about 65%.

100 kg of the edible fibers prepared in the above manner and 50 kg of the fish meat paste prepared as in Example 6 were kneaded and formed into a sheet of 10 mm in thickness, which was steamed at about 95° C. for 30 minutes and cut into shrimp-shaped pieces.

What we claim is:

1. An edible product simulating the meat of shrimp, prawn or lobster comprising a heat-coagulated mixture of fish meat paste, edible fibrous material and at least one additive selected from salt, seasoning agents, starch and texturing agents, said fish meat paste being made from "surimi" of fish meat and said fibrous material having a three-dimensional reticulate structure, and wherein said fibrous material is present in said product in an amount of from 0.2 to 2.5 parts by weight to 1 part by weight of said fish meat paste.

2. The product of claim 1, wherein said fish meat paste has added thereto ingredients to impart a taste and/or smell similar to those of the meat of shrimp, prawn or lobster.

3. The product of claim 1, comprising a solid piece shaped and colored like a shrimp, a prawn or a lobster.

4. The product of claim 1, wherein said edible fibrous material is made from a material selected from the group consisting of polysaccharides, animal proteins, vegetable proteins and vegetable fibrous material.

5. The product of claim 1, wherein said edible fibrous material comprises a large number of irregularly shaped thin fibers having branches and being twisted, bent and intertwined to form said three-dimensional reticulate structure.

6. The product of claim 5, wherein the diameter of said fibers is less than 1 mm.

7. An edible product simulating the meat of shrimp, prawn or lobster comprising a heat coagulated mixture of fish meat paste, edible fibrous material selected from the group consisting of polysaccharides, vegetable proteins and vegetable fibrous material, and at least one additive selected from salt, seasonings, starch and texturing agents, said fibrous material having a three-dimensional reticulate structure and a fiber size of less than about 0.5 mm diameter, and present in said product in an amount of from 0.4 to 2.0 parts by weight based upon 1 part by weight of said fish meat paste.

8. The product of claim 7, wherein said fish meat paste has added thereto ingredients to impart a flavor and/or a smell resembling those of the meat of shrimp, prawn or lobster.

9. The product of claim 7, comprising a solid piece shaped and colored like a shrimp, a prawn or a lobster.

10. A process for preparing a product simulating the meat of shrimp, prawn or lobster comprising the steps of:
(a) preparing a fish meat paste;
(b) preparing an edible fibrous material having a three-dimensional reticulate structure;
(c) admixing 1 part of said fish meat paste with from 0.2 to 2.5 parts by weight of said fibrous material;
(d) kneading said mixture;
(e) shaping said kneaded mixture into pieces of predetermined size and shape; and
(f) coagulating said pieces by heat application thereto.

11. The process of claim 10, wherein said edible fibrous material is made from a material selected from the group consisting of polysaccharides, animal proteins, vegetable proteins and vegetable fibrous material.

12. The process of claim 10, wherein there is added to said fish meat paste ingredients to impart a flavor and/or a smell similar to those of the meat of shrimp, prawn or lobster and further including the step of coloring the surface of said kneaded material so that said shaped pieces look like shrimp, prawn or lobster.

13. The process of claim 10, further including the step of coagulating said kneaded mixture before said shaping step.

14. A process for preparing an edible product simulating the meat of shrimp, prawn or lobster comprising the steps of:
(a) preparing a fish meat paste;
(b) preparing an edible fibrous material having an average size of less than about 0.5 mm in diameter, said fibrous material having a three-dimensional reticulate structure and selected from the group consisting of polysaccharides, vegetable proteins and vegetable fibrous material;
(c) admixing 1 part by weight of said fish meat paste with from 0.4 to 2.0 parts by weight of said fibrous material;
(d) kneading said mixture;
(e) shaping said kneaded mixture into pieces of predetermined size and shape; and
(f) coagulating said pieces by heat application thereto.

15. The process of claim 14 wherein there is added to said fish meat paste ingredients to impart a flavor and/or smell similar to the meat of shrimp, prawn or lobster and the shaped pieces are colored to approximate the coloring of shrimp, prawn or lobster.

16. The process of claim 14 wherein the kneaded mixture is subjected to heat coagulation prior to the shaping thereof.

17. The process of claim 10 wherein at least one additive selected from salt, seasonings, starch and texturing agents is added to said mixture.

18. The process of claim 14 wherein at least one additive selected from salt, seasonings, starch and texturing agents is added to said mixture.

* * * * *